Aug. 15, 1967 A. J. JORGENSEN ET AL 3,336,581

ADDRESSING MATRIX FOR DISK MEMORIES

Filed July 13, 1964 4 Sheets-Sheet 1

INVENTORS
ARNOLD J. JORGENSEN
LORRIN O. ANDERSON
BY
Christie, Parker & Hale
ATTORNEYS.

Aug. 15, 1967 A. J. JORGENSEN ETAL 3,336,581

ADDRESSING MATRIX FOR DISK MEMORIES

Filed July 13, 1964 4 Sheets-Sheet 3

INVENTORS.
ARNOLD J. JORGENSEN
LORRIN O. ANDERSON

BY Christie, Parker & Hale
ATTORNEYS.

ADDRESSING MATRIX FOR DISK MEMORIES

Filed July 13, 1964

4 Sheets-Sheet 4

INVENTORS.
ARNOLD J. JORGENSEN
LORRIN O. ANDERSON
BY
Christie, Parker & Hale
ATTORNEYS.

United States Patent Office 3,336,581

Patented Aug. 15, 1967

3,336,581

ADDRESSING MATRIX FOR DISK MEMORIES

Arnold J. Jorgensen, Duarte, and Lorrin O. Anderson, Covina, Calif., assignors to Burroughs Corporation, Detroit, Mich., a corporation of Michigan Filed July 13, 1964, Ser. No. 382,226
15 Claims. (Cl. 340—172.5)

ABSTRACT OF THE DISCLOSURE

An addressing matrix of this invention includes read/write heads as cross points. A row select voltage and a column select current sink designates one head as a selected head for either a read or write operation. For reading, an additional operation is required, which additional operation involves connecting a constant current source to a read bus pair. This constant current source forward biases diode means which are connected between a selected head and the read bus pair, and this completes a read path from a selected head to the read bus pair. The above mentioned constant current source is disconnected during a write operation, and high writing current is provided to the column select current sink by the row select voltage. The invention further describes the employment of a pair of column selection leads together with groups of parallel-connected read/write heads, with each group exhibiting an inherent capacitance. Diodes series-connect each parallel group to the leads of the column selection circuitry in a manner which reduces the overall inherent capacitance of the matrix.

This invention relates in general to information head selection circuits, and more particularly to a selection circuit of the matrix type having an exceedingly large number of cross points and a low noise level as provided by a novel and unique diode arrangement in cooperation with cross point selection by means of a voltage at one axis, and by means of a constant current sink at another axis.

While not limited thereto, this invention finds special application in a magnetic memory system of the random access storage device type which employs numerous magnetic disks having as its main advantage, a large volume for information storage. An information address recording and retrieval system of this type, in which one head for each track is provided for both reading and writing, is described in a patent application by Ralph A. Gleim et al., Ser. No. 306,365, filed Sept. 3, 1963, and assigned to the same assignee as the present application.

The address recording and retrieval system as described in the above-mentioned patent application includes an address register in a common control which is used to select one of 6,000 heads for a maximum capacity disk file system. Non-return to zero recording is employed, and during a read operation only relatively weak signals are recovered by a selected head as compared to the relatively large write signal which is conducted through the same head and select circuits during a write operation. This common circuitry for read and write operations in a large matrix which may advantageously be 100×60, places stringent requirements on the matrix and selection circuits, and requires that all stray capacitance be held to a minimum in order that the relatively weak A.C. signals recovered during a read operation may be gated from the matrix over a read bus and associated amplifier. In addition, provision must be made to gate a large write signal through this common circuitry.

Prior art matrices present significant inherent capacitance in the head connections within the matrix, and further present even greater inherent capacitance in the selection circuitry. Furthermore, it has been common practice in prior art matrices, when a read operation is to take place, to connect the read bus to the output of the selection circuitry either in the row or in the column section. This approach requires that the weak read signals pass through the selection circuitry before it may be transmitted to utilization circuits by a read bus and associated amplifiers. This additional selection circuitry in the transmission path increases the impedance and capacity for the overall matrix system with the resulting possibility that weak read signals may not properly be recovered.

A further drawback associated with the prior art matrix approach is that today's modern computer memory systems are high speed operated devices which thus require high speed selection circuitry such as is offered by transistors. Transistors, although having fast switching speed, are recognized as presenting three or four times the capacity of diodes which are capable of being switched equally as fast, but have a much lower capacity. Prior to this invention however, diodes and transistors connected in the novel manner discussed hereinafter, have not been successfully combined to eliminate the stray capacitance which exists in the prior art matrices.

The above-mentioned factors which contribute to the overall noise and crosstalk which is associated with prior art matrix schemes, represent very practical problems which in the past has prevented employment of matrices as large as those required for modern day random access storage systems. This invention overcomes the above-mentioned disadvantages of the prior art and allows the employment of a larger matrix than those of the prior art. The addressing system of this invention further includes new and novel selection and noise isolation circuitry capable of a two way read-write operation.

In accordance with the principles of this invention, a disk file memory, having a plurality of disks each having a plurality of information track zones with different information frequencies in each zone, employs a matrix circuit including new and novel head grouping and head isolation circuitry. Each zone of the system includes a predetermined number of tracks, and an even number of heads. All heads of one zone are arranged into groups hereinafter called head sets. The several head sets of one zone are connected in parallel across a pair of column selection leads by a pair of isolating diodes, poled normally non-conductive, and one each of which is connected in series between one side of each head set and one lead of the selection pair. Each head set includes a plurality of information heads and series-connected head isolation diodes which are referred to hereinafter as head banks. These banks within a set, are also connected in parallel and are isolated from every other bank by head isolation diodes, poled normally non-conductive. Connected in this fashion, the head set isolation diodes reduce the overall capacity which is the source of noise and crosstalk mentioned hereinbefore. All the matrix diodes exhibit a small amount of reverse bias capacity, but this capacity is reduced in value over prior matrix capacities because the capacitance of the head bank diodes are connected in series with the capacitance of the head set isolation diodes.

All of the information heads of all zones are individually addressed in one axis by a common head, or row, selection circuit which is provided with a number of outputs equal to one disk's zone head capacity. The remaining address axis for the matrix includes one read-write selection switch for each zone. All zones of one frequency share a read bus pair which is interposed between the matrix cross points and the selection circuit of one axis. This read bus is normally A.C. and D.C. isolated from both the cross points and the selection circuits by read bus isolation diodes. These read bus diodes are poled in such a manner that a select operation in both axes for the matrix only partially completes the selection process required for a read operation. A complete read operation requires that the selection circuitry for one select operation connect a source of constant voltage to one head in all zones, and a second select operation connects a constant current sink to that zone to absorb part of the select current, and further requires that a source of constant current which is connected to, and associated with, the read bus pair provide the remaining current for the constant current sink, whereby only one pair of head bank, head set, and read bus diodes are forward biased to complete a read path for a selected information head.

A complete understanding of the foregoing principles of this invention may be gained from consideration of the following detailed description together with the accompanying drawing, in which.

Figure 3:
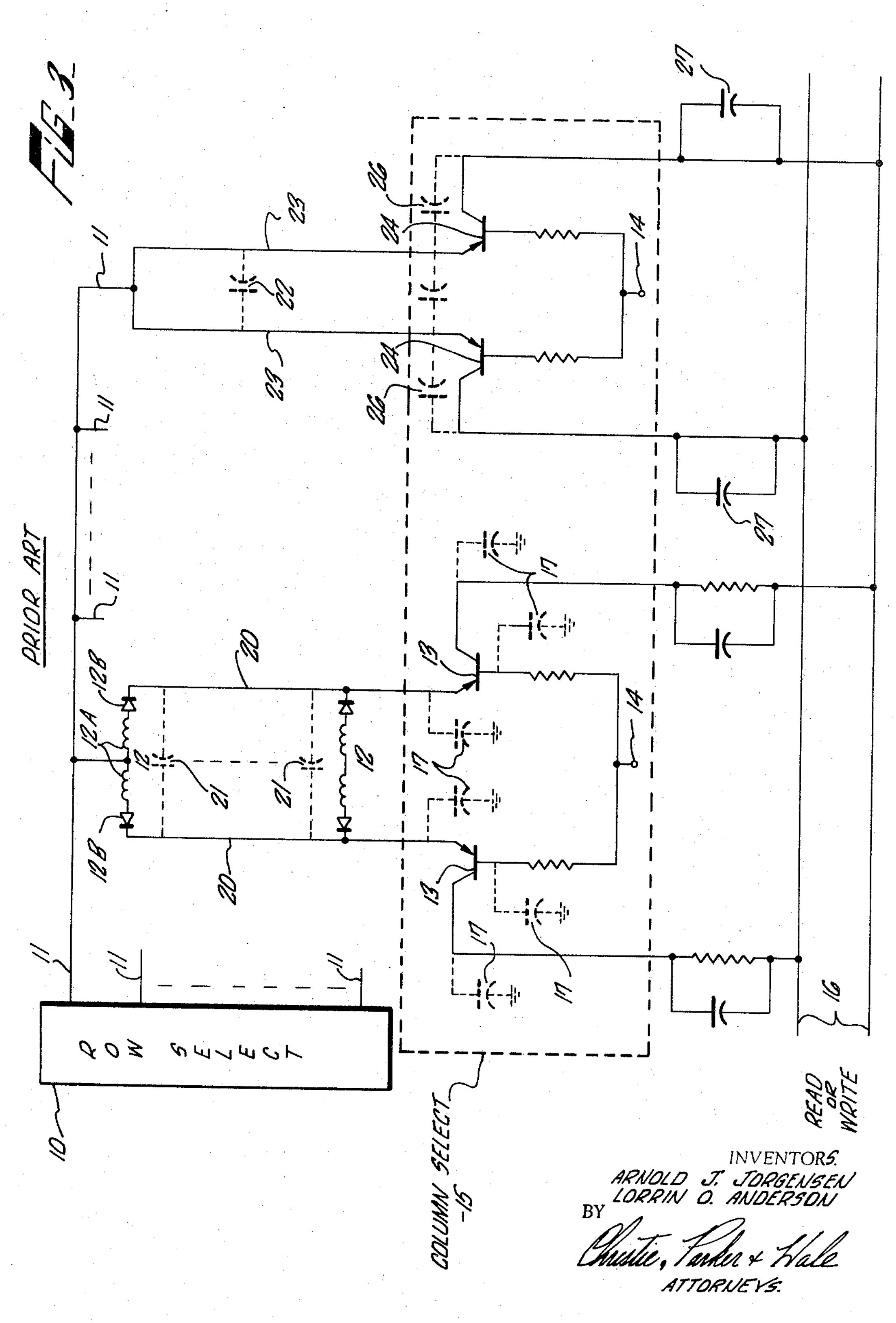
FIG. 3 depicts a combined block diagram and schematic circuit of a matrix common to the prior art; and, FIG. 4 is a schematic diagram showing the novel and unique diode isolation grouping for a select and read operation in accordance with the principles of this invention.

A typical prior art matrix is shown in FIG. 3, and includes row select and column select circuits 10 and 15 respectively, and a plurality of information head cross points 12, of which only two are shown in detail. Each of the information heads is adapted for both read and write operations, and comprises a center tap transformer 12A, and a pair of isolation diodes 12B, connected between the output of the transformer and a selection lead pair 20. Reading or writing a binary "one" or binary "zero" is performed through one half of the center tap transformer 12A and one diode 12B. It is standard practice to select a row by applying a select (i.e. center tap) voltage from the row select circuitry 10 in common to a plurality of information heads 12 connected to one of the row select leads 11. A center tap voltage applied to one row of information heads 12 performs a partial select operation which is completed when a column is selected by the column select circuit 15.

The column select operation of the prior art circuit of FIG. 3, requires an enabling signal at terminal 14 which is connected in common to the base leads of two switching transistors 13, and is of sufficient magnitude to drive both transistors into saturation. This prior art operation is attendant with numerous noise or crosstalk disadvantages and involves signal strength losses for the recovered, or read, signals as well. These disadvantages result from the inherent capacity of the prior art matrix as shown by the capacitances in dashed lines. The adverse effect of these capacitors on signal strength will be discussed first.

When saturated during a column select operation, switching transistors 13 have inherent capacitive coupling from each transistor lead to ground. This capacity, when transistors 13 are saturated, is shown representatively by dashed capacitors 17. During such a select operation, the collector, base and emitter electrodes of transistors 13 can be considered tied together because of saturation, and thus all of the capacitors 17 are in parallel and their combined capacitive effect is additive. Any signals recovered from a memory disk positioned adjacent to a selected head are weak and these capacitors 17 represent a direct short to ground for such A.C. signals. Accordingly, a portion of the read signal is lost to ground prior to its transmission through the column select circuit 15 to the read bus 16.

A further problem associated with the prior art matrix of FIG. 3, results from the fact that two separate crosstalk paths exist in the matrix. Crosstalk occurs in the first path through the back impedance of the diodes associated with the unselected heads in the selected column 20. In a magnetic memory disk system having one head per track, each head is positioned to be inductively coupled to its own track and thus each of the unselected heads of column 20 is constantly receiving information signals which must not appear at the read pair 16. These signals however do appear on read bus 16 as a form of crosstalk because of the combined capacity from the unselected heads. This capacity represented as dashed capacitors 21 is also parallel for the entire column 20, and thus adds to a considerable amount of capacity which A.C. couples signals from all of the unselected heads to column select leads 20. Accordingly, the signal read by a selected head in column 20 has associated with it a high amount of noise that is introduced by the back bias capacity of each of the unselected head isolation diodes.

A second noise path for the prior art matrix is from the unselected heads in the selected row through the off impedance of the unselected column select transistor switches 24. A row select operation forward biases one head in every column, and accordingly, signals picked up from these heads are gated to the emitter leads of each column select switching transistor. Noise signals from the unselected heads in each column are also present at the emitter of each column select transistor due to the presence of the diode capacity shown as 22 in column 23, which noise was described hereinbefore. It is well recognized that back biased transistors, such as transistors 24, have a significant collector to emitter capacity. This collector-emitter junction capacity for each transistor 24, is shown as dashed capacitors 26, and is approximately four times that to be expected of a back biased diode. Accordingly, the A.C. signals just mentioned that are present at the emitters of column select transistors 24, and all of the other unselected column transistors not shown in FIG. 3, pass through capacitors 26 and the capacitors 27, and are transmitted by read bus 16 as crosstalk noise which contaminates information signals from a selected information head.

In addition to the capacity problems discussed hereinbefore, it is apparent that by positioning the read pair at the output of the column select circuit 15 in the manner shown in FIG. 3, all D.C. bias signals at the column select terminals 14 appear on the read pair 16, and such signals also contribute to the noise and crosstalk problems for this system. Furthermore, the biasing approach for the column select transistor pairs requires that the emitter of each transistor momentarily shift its D.C. operating level for each select operation until it recovers by a voltage built up in the information head transformer. These shifts in D.C. operating level introduce further noise transients into the matrix during every signal recovering operation.

The above described undesirable noise and crosstalk problems of the prior art matrix of FIG. 3, renders such approaches totally unworkable for the large number of information read-write heads present in today's modern random access disk memory systems. The addressing and matrix circuits in accordance with the principles of this invention essentially eliminate the above described stray capacity effects of the prior art matrix, and thus provide a selection and information recovery operation which is sufficiently free of all crosstalk that an efficient, simple and compact matrix circuit, considerably larger than that possible in prior art matrices, is now feasible for a disk memory system of the type shown in FIG. 1.

Figure 1:
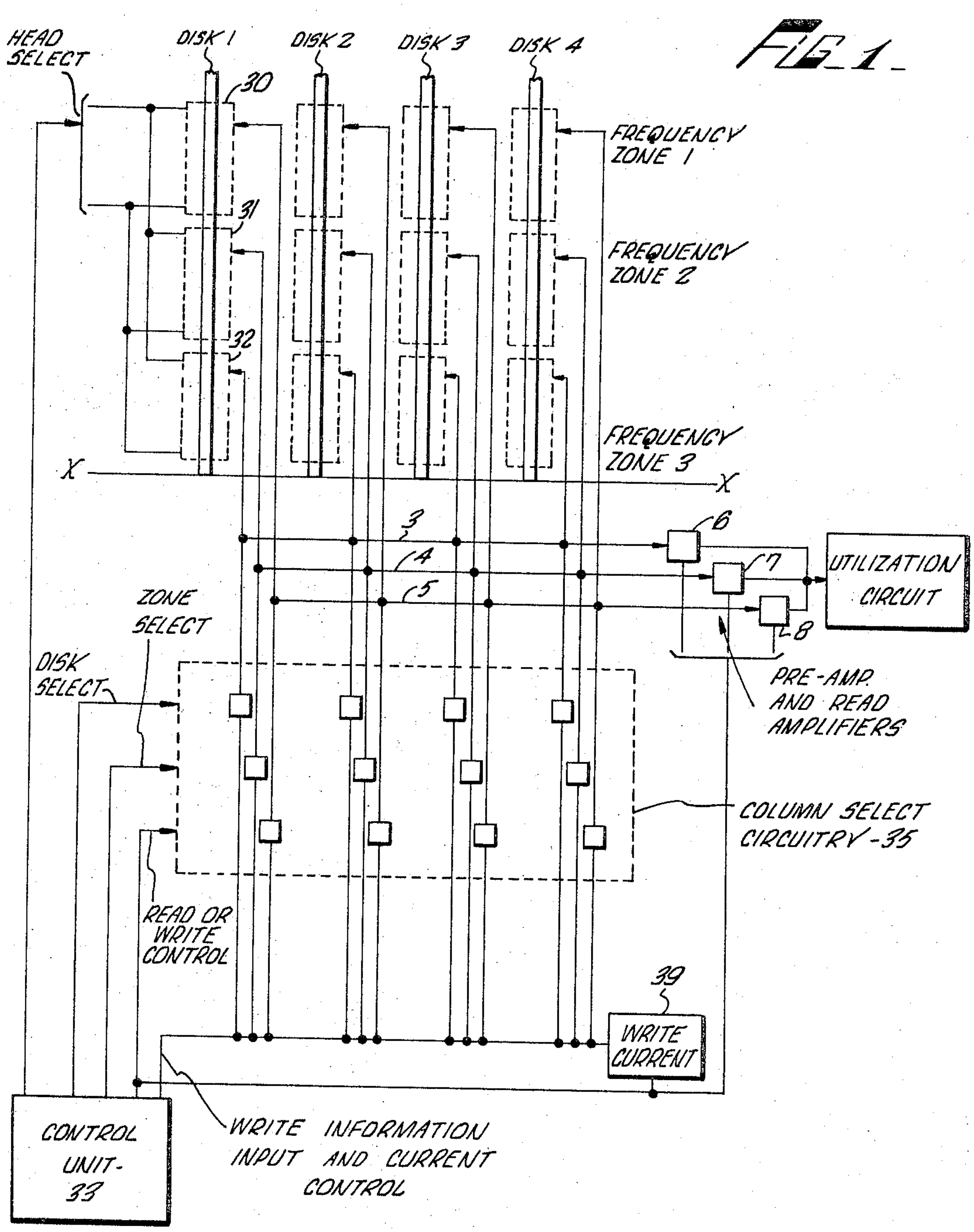
FIG. 1 is a block diagram of a portion of a disk file memory system in which each disk has three information zones.

In FIG. 1, a disk memory file is shown which may advantageously comprise 20 disks of which only one group of four is shown. These disks each contain numerous tracks of information in the form of magnetically recorded impulses. These information tracks are thus somewhat similar to tracks on a phonograph record except that the magnetically recorded tracks of a disk memory are circular rather than spiral, and each track has associated therewith one information read-write head, rather than having one head associated with a single disk side.

The four disks of FIG. 1, are rotably mounted about an axis X—X and each may advantageously have three zones of 100 tracks each, with 50 tracks of each zone on each disk face as shown representatively by the dashed zones 30–32 on both sides of disk 1. These disks rotate at a constant speed and accordingly the outer zone 30 shown in FIG. 1, has a higher linear velocity under the information heads for that zone. Information in binary form is thus recorded thereon at a higher frequency than that of the remaining zones 31 and 32. By grouping all of the disks into these same three frequency zones 1 through 3, only three distinct read bus pairs 3 through 5 and associated pre-amplifiers and read amplifiers 6 through 8 are required for a complete system. This novel arrangement allows amplifier adjustments and signal handling operations to be significantly more straightforward than other prior art approaches.

The pre-amplifiers and amplifiers 6 through 8 may advantageously be of the multi-gain type which amplify input signals of varying amplitudes in such a manner that a substantially constant output signal is obtained from all of the frequency zones. This amplifier arrangement is described and claimed in a patent application entitled Automatic Gain Level Stepping System by Kenneth D. Krossa and Michael I. Behr, Ser. No. 382,231, filed July 13, 1964 and assigned to the same assignee as the present application. One read bus for each frequency zone of all of the disks of FIG. 1, is connected between the information heads of the zones and the column select circuitry 35. This placement of the read bus plus the novel and unique grouping of the information heads within each zone, and the provision of one read-write select circuit for each zone, essentially eliminates all noise and crosstalk problems from head selection operations for the circuit of FIG. 1, as will be discussed in detail hereinafter.

Control unit 33, of FIG. 1, selects one information head from the memory system of FIG. 1, and may advantageously include an address register of the type described in the aforementioned Gleim et al. patent application, which provides the facility for performing several select operations at its output leads as labeled in FIG. 1. These operations include a head select operation performed by applying a signal to one of a group of lines which may advantageously number 100. As shown in FIG. 1, this head, or row, select operation applies a selection signal to one head in every zone in all 20 disks, or stated otherwise, to 60 information heads located in 60 different head sets. A column select operation is also performed by control unit 33 wherein it applies control signals which select one only of 60 read-write select circuits in column selection circuitry 35. Control unit 33 also applies either a read or a write command signal to the column select circuitry 35; and a control unit 33 will further apply an enabling signal to one of the read amplifiers 6 through 8 when a read operation is desired. Thus, in a read operation there must be a column select, a row select, and an enabling signal at one of the read amplifiers in order to recover information from one selected head. During a write operation the same 60 column select circuits are employed in connection with a write current control circuit 39 that is shared in common by all 60 column select circuits. Both of these read and write operations will be considered in greater detail hereinafter.

Figure 2:
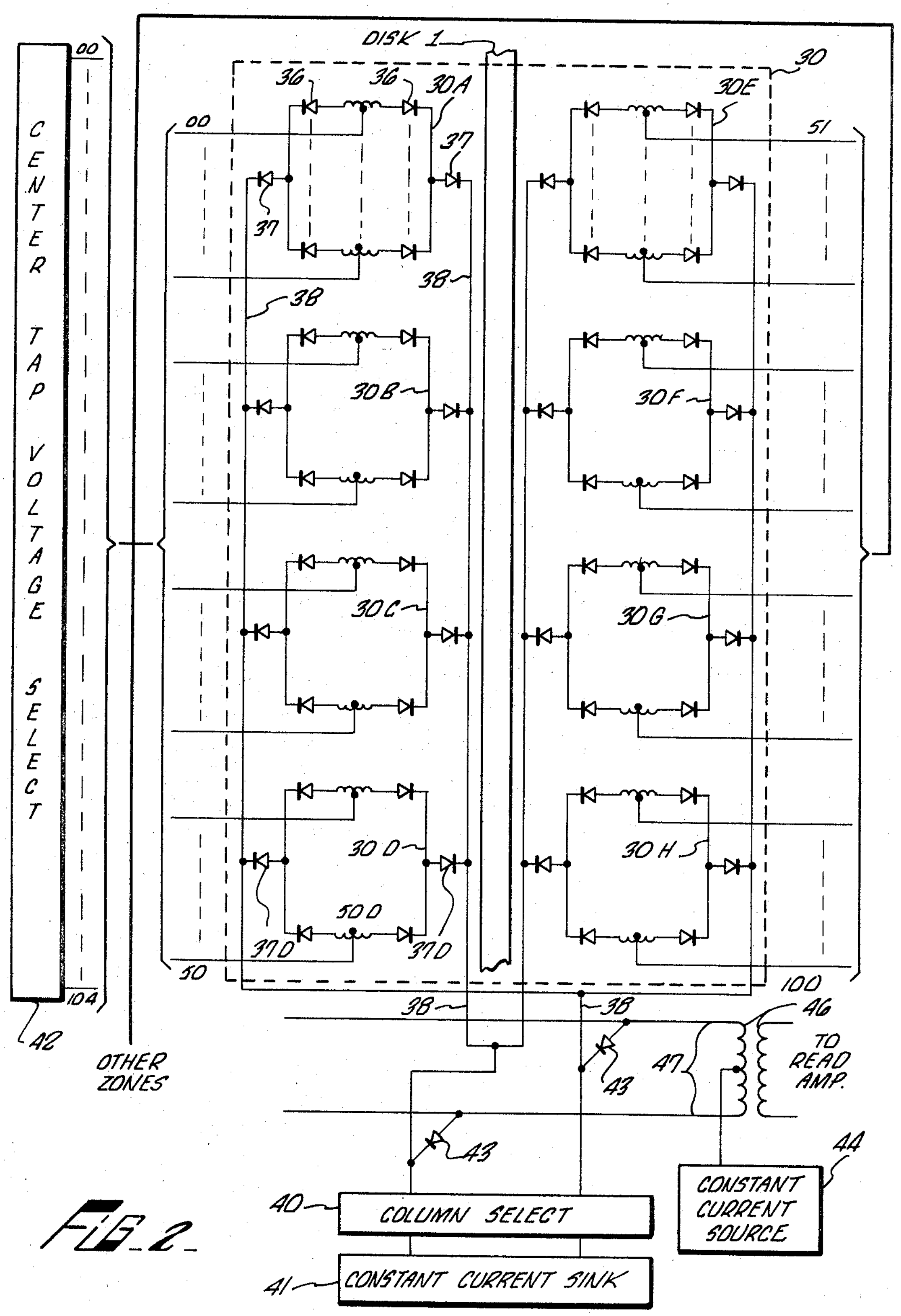
FIG. 2 is a combined block diagram and schematic circuit of one zone of FIG. 1, which shows the head bank and head set connections and their accompanying isolation diodes.

Turning now to FIG. 2, all of the information heads associated with one zone 30 of disk 1 are shown in more detail. Zone 30 may advantageously contain 50 information tracks on each side of disk number 1 each of which has its own information head. Each head is of the prior art center-tapped type with head isolation diodes. These heads are grouped into eight head banks 30A through 30H, wherein each head bank has associated therewith 13 heads connected in a parallel circuit. This arrangement provides for two spare heads on each disk face per zone. Every bank of parallel connected heads is further connected in parallel with every other bank by a head bank isolation diode pair 37 and a selection lead pair 38. As mentioned hereinbefore, the information frequency on each side of the frequency zone 1 of FIG. 2, is the same, and accordingly the head banks 30A through 30H are all connected in parallel and then in common to one column select circuit 40. Only one head from this one zone receives a center tap voltage from the row or center tap select circuit 42. Center tap select circuit 42 may advantageously comprise 104 row select output leads 00 through 104 (4 are for spares) and of these, 100 row select leads are individually connected, each to one center-tapped head of zone 30 and similarly connected in common to all other information heads in all other zones of all the disks for one system.

The reduction in crosstalk and noise problems, and the preservation of recovered signal strength, that is accomplished by the circuit of FIG. 2 by the novel connection of the head bank isolating diode pair 37 may best be appreciated by considering a column and row select involved during an information recovering operation. A row and a column select places a signal on output lead 50 of row select circuit 42, and also enables column select circuit 40. This select operation designates head 50D of head bank 30D of zone 1 of disk 1. The center tap select voltage which is applied to head 50D by circuit 42 forward biases the head isolation diodes for that head, and also forward biases the head bank isolation diode pair 37D. The D.C. bias current from this center tap select operation is conducted through the activated column select circuit 40 by leads 38 to the constant current sink 41. A read operation cannot be performed at this point in the operation because the column select leads 38 are connected through a pair of read bus isolation diodes 43 which, as is true for all the other diodes connecting the various zone select lines to the read bus, are back biased unless a read amplifier has been activated. These diodes accordingly provide complete isolation of the read bus from the inherent capacity of the matrix of this invention which, of course, is far less than that of the prior art matrices because the image capacity at the read bus from all the matrix circuitry is significantly reduced by the head banks 30A through 30H and their associated head bank isolated diode pairs 37. It was pointed out hereinbefore that in the prior art matrix as many as 100 heads would be connected in parallel to a column selection lead pair such that their back bias capacities would be additive. Employment of the head bank isolation diodes 37 however, reduces the effective capacity of the reverse bias diodes by connecting the capacities of the head diodes 36 and the back bias capacity of the head bank diodes 37 in series; and thus accomplishing a significant reduction in the overall crosstalk problem common in the prior art matrices.

Furthermore, even further isolation from the reduced capacity mentioned above is afforded by the read bus isolation diodes 43 which also are back biased. Only one pair of read bus isolation diodes will be forward biased for a read operation, and this pair will be determined by the row and column selection operation just described together with current flow from the constant current source 44 which is connected to the center tap of a terminating transformer 46 for read bus pair 47. One half of the amount of current which the constant current sink 41 is adjusted to receive is obtained from the center tap and column select operation, and the remaining half of the D.C. bias current for sink 41 is obtained in equal amounts from constant current source 44 through the twin circuits comprising one lead of read bus 47, one half of transformer 46, and one diode of the read bus isolation diode pair 43. This select operation assures that the D.C. bias current does not alter the D.C. operating level for the matrix circuit, and further assures freedom from noise transients by the balanced read bus pair.

It should also be noted that the above described matrix select operation provides only a single path which has one pair of forward biased head diodes, head bank diodes and read bus diodes which present essentially infinite capacity, or a short circuit, for the A.C. signals which are recovered from a memory disk store during a read operation. These signals so recovered are transmitted out the read bus without passing through the column selection circuitry and thus full signal strength and avoidance of signal loss to ground through the inherent transistor capacities of prior art matrices are assured. These assurances are discussed in further detail hereinafter in connection with FIG. 4, which shows a circuit diagram of the selection circuitry and the selected zone 30D of FIG. 2.

Figure 4:
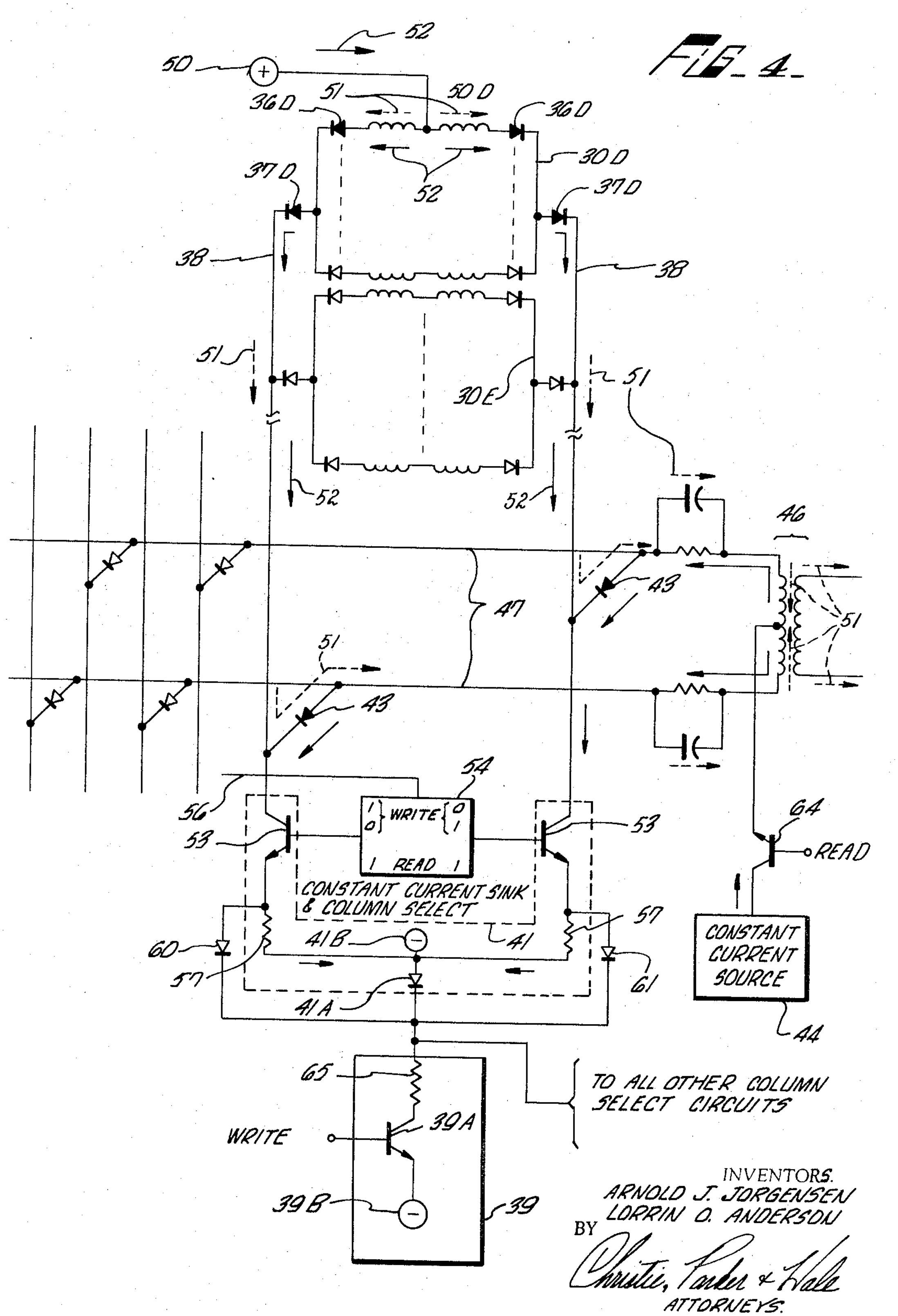

In FIG. 4, the selected head 50D is shown connected to a positive source of potential which is applied by the center tape select circuit 42 of FIG. 2 by the operation described hereinbefore. The select leads 38 of FIG. 4 would, of course, have six other head banks 30A through 30C, and 30F through 30H, but only banks 30D and 30E are shown. Each of the diodes which are forward biased by the head select voltage 50 and the current select operation to be described are shown solid, whereas all back biased diodes are shown in outline form. The path for an A.C. read signal is shown by the dashed arrows 51, and the paths of the two D.C. bias currents are shown by the solid arrows 52.

It should be understood, of course, that with respect to the dashed arrows 51 depicting a read operation, that either a "one" or a "zero" would be recovered at any one instant, and both would have different directions of current flow. Thus, the depicted arrows indicate the current path and not the actual current itself. As shown by these dashed arrows 51 and associated darkened diodes, a read path includes the read head 50D and its associated head isolation diode pair 36D, a head bank diode pair 37D, select leads 38, read bus diodes 43, and the center-tapped output transformer 46 of read bus pair 47.

In a similar manner the paths for the D.C. bias current are shown by the solid arrows 52 one of which originates from the row select source 50, and the second of which originates from the constant current source 44 through the read controlling transistor switch 64 which is enabled, during a read operation, by a signal from control unit such as 33 of FIG. 1. These solid arrows 52 are shown passing through a constant current sink and column select circuit 41, which includes a transistor pair 53, a resistor pair 57, and a voltage source 41B. This transistor pair 53, and flip-flop circuit 54 which controls the conductive state of transistor pair 53, also constitute a column selection switch for one column select pair 38 in the matrix of FIG. 4. Flip-flop 54 advangeously is of the type known to the prior art having at least three different output states which are controlled by signals on input lead 56 from a control circuit such as 33 of FIG. 1.

For the read operation depicted by FIG. 4, flip-flop 54 assumes a "one" state at both output leads. This "one" state may advantageously be ground; and thus, the transistor pair 53 is of the grounded-base configuration and is driven conductive by the circuits including resistor pair 57 and bias source 41B which are connected to the emitters of transistor pair 53. Source 41B and resistors 57 are chosen in relation to the constant current source 44 so that both transistors of pair 53 conduct only a partial amount of the current which sink 41 is designed to draw from the matrix circuit. This operation permits a small amount of bias current from constant current source 44 to complete the read signal recovery path on read bus 47 by forward biasing the read bus isolation diodes 43, and further allows the row voltage select operation to forward bias diode pairs 36D and 37D, as shown by their darkened condition. This new and novel row and column select operation just described permits the employment of small control currents for transistor pair 53 which are never biased to saturation, and thus the serious capacitive effect of saturated transistor schemes used by the prior art is eliminated. Furthermore, the transistor pair 53 do not adversely affect the D.C. operating level of the matrix and are positioned out of the A.C. signal path, and by this novel operation, noise and crosstalk difficulties experienced by the prior art schemes are further eliminated.

Our novel addressing system allows common utilization of the row and column select circuitry for both read and write operations, and the read bus diodes pair 43 assure complete isolation of the read amplifiers and other associated circuitry during a write operation in the manner described hereinafter. Flip-flop 54 assumes one of the write states shown therein in FIG 4 when a write operation is involved. These states depend upon the write information input from the control unit 33 of FIG. 1 and will, of course, be opposite when a "one" and then a "zero" is to be written on one of the disk file memories. During a write operation the write current control 39 of FIG. 1 is signalled by control unit 33, which signal as shown by details of FIG. 4 biases a transistor 39A conductive. Transistor 64 is off during a write operation and thus the constant current source 44 does not provide any current for read bus 47 which is isolated from the row and column selected head by back biased diodes 43. This isolation assures that the much larger write current does not appear on the read bus 47 and introduces noise transients into the read amplifiers and utilization circuitry.

Source 39B is more negative than source 41B of the constant current sink circuit 41 and thus diode 41A is back biased and one or the other of diodes 60 and 61 will also be back biased during a write operation. The conductive condition for these diodes depends upon the state of flip-flop 54 which will drive either the right or left transistor of pair 53 conductive. The write current is conducted through one lead of the column select pair 38, one transistor of pair 53, resistor 65, and transistor 39A. This write current magnetically stores an impulse on a disk memory in a well known manner.

As described above, only one transistor of pair 53 and the write current control transistor 39A are conductive for any single write operation and complete one write current path through the row and column select circuits and one part of a selected head. The remaining path is back biased and thus the written "one" or "zero" is more precise, stronger, and more easily recovered than in prior art approaches in which it is common to saturate both transistors of pair 13 of FIG. 3, and thus complete a loop for induced current through both sides of a selected head. This prior art approach results in blurred and weaker signals than does the new and novel combined read and write operation of this invention.

It is to be understood that the above described arrangements are illustrative of the principles of this invention. Numerous other arrangements may be devised by those skilled in the art without departing from the spirit and scope of this invention.

What is claimed is:

1. An addressing circuit for recovering information stored in a disk file system, said addressing circuit including a cross point matrix having read/write heads as matrix cross points, said addressing circuit comprising:

a plurality of read/write heads, one each assigned to each concentric track on a disk file and each head constituting a cross point that is normally blocked to information-representing alternating current signals induced therein by information stored in the tracks of the disk, and each head being capable, when provided with a completed direct current bias circuit, of recovering the information-representing alternating current signals induced therein;

a first direct current source and a row select means for partially selecting at least one head by partially completing a direct current bias circuit from the first source to at least one and, normally several, read/write heads from among the plurality of read/write heads;

a column select means for fully selecting one head only by fully completing a direct current bias circuit which includes said one fully selected head from among those read/write heads partially selected by said row select circuit;

signal transmission means suitable for conducting information-representing alternating current signals from said one fully selected read/write head;

diode means connected between the signal transmission means and the completed bias circuit for the one fully selected read/write head, said diode means poled normally nonconductive relative to said direct current bias and normally exhibiting a blocking impedance to alternating current signals read by said read/write head;

a second direct current source having a polarity and magnitude sufficient to forward bias said diode means when connected thereto;

normally open switch means between said second source and said transmission means and selectively closeable for connecting said second source to said diode means through the transmission means; and read/write control means selectively closing said switch means during a read operation, for completing an alternating current path to said transmission means for signals induced in a fully selected read/write head.

2. An addressing circuit in accordance with claim 1 wherein the disk file system includes a plurality of disks each including at least two zones of plural information tracks having a different information frequency in each zone, and wherein:

the column select means of said addressing circuit comprises an individual column select circuit for each information frequency zone connected in common to all read/write heads assigned to the plural information tracks of the information zone associated with the individual column select circuit; and the signal transmission means of said addressing circuit comprises an alternating current signal transmission path individual for each information frequency zone.

3. An addressing circuit in accordance with claim 2 and further comprising:

a write current control connected in common to all of said individual column select circuits and responsive to a write command from said read/write control means for increasing the amount of bias current through a fully selected head; and means connecting said write current control to said read/write control means for applying write command signals therefrom to said write current control.

4. An addressing circuit in accordance with claim 3 wherein:

said individual column select circuits each comprise a pair of switching devices and a pair of column select leads series connected to said switching devices, said column select leads being further connected in parallel across all read/write heads assigned to the plural information tracks of the information zone associated with the individual column select circuit; and means connected to said switching device pair and to said read/write control means for closing one only of said switching devices concurrently with the application of write command signals from said read/write control means to said write current control.

5. An addressing circuit in accordance with claim 4 wherein:

said means connected to said pair of switching devices comprises a multi-state device having a first output state for concurrently closing both switching devices of said pair during a read operation, and a second output state for independently closing one or the other of the switching devices of the pair during a write operation.

6. In a disk file system an addressing circuit for a plurality of disk memory stores, each disk being arranged with frequency zones of a predetermined number of tracks of information, with the tracks having recorded thereon binary signals of distinct and different frequency rates for each zone, said addressing circuit comprising:

a cross point matrix having information handling heads as matrix cross points with one head each for each track in all of said zones;

means within each zone for connecting predetermined numbers of said heads in parallel with each other to form a plurality of distinct head bank circuits each including a predetermined number of said heads, and each head bank circuit exhibiting an inherent capacitance;

a pair of column select leads for each one of said zones;

a pair of diodes for each head bank circuit, each diode representing an inherent capacitance in its normally nonconducting state, and each diode of a pair being series connected between a head bank circuit and one lead of the pair of column select leads for reducing the effective inherent capacitance between the pair of column select leads; and an information head select circuit connected in common to all heads in all of said zones and operative for applying a head select voltage to one selected head only in each of said zones, said head select voltage being of a polarity relative to said diode pairs for establishing current conduction in only one head and one diode pair connected to the head bank which includes the selected head.

7. An addressing circuit for a disk file system in accordance with claim 6 wherein each of said heads in a head bank circuit comprises:

a transformer winding having two end terminals and an intermediate terminal, said intermediate terminal being connected to said information head select circuit, and a pair of head-isolation diodes for each head, one head-isolation diode each connected between one end terminal of said transformer winding and said means for connecting said heads in parallel with the other heads in said head bank circuit, said isolation diodes for each head being poled in a direction to be forward biased by said head select voltage.

8. An addressing circuit for a disk file system in accordance with claim 7 and further comprising:

a pair of read bus lines individual to common frequency zones in all of said disks; and pairs of read bus diodes, one diode of each pair connected between one read bus line of the pair of read bus lines and one lead of said pair of column select leads, each diode of said diode pairs being poled in a normally nonconductive condition relative to said head select voltage.

9. An addressing circuit for a disk file system in accordance with claim 8 and further comprising:

a source of constant current capable of rendering said read bus diodes conductive when connected thereto; and means selectively operable for connecting said source to at least one pair of said read bus lines during a read operation for said addressing circuit.

10. An addressing matrix comprising:

a plurality of cross points defined by a plurality of row conductors and a plurality of column conductors;

a source of voltage;

a row select circuit connected between said plurality of row conductors and said voltage source and operative for applying a voltage from said source to one of said cross points;

a sink circuit individual to each column conductor for receiving a fixed amount of constant current;

means connecting said sink circuit to one column conductor associated with a cross point to be selected for completing a path for one portion of said fixed current amount from said voltage source through a selected one of said cross points;

a memory store positioned to induce a recoverable signal in a selected cross point;

signal transmission means connected between a selected cross point and said constant current sink circuit;

means isolating said transmission means from signals induced in said selected cross point; and means for overcoming said isolating means and completing a recovery path for signals induced from said store at a selected cross point, said last claimed means comprising a source of constant current connected to said signal transmission means for supplying the remaining amount of said fixed constant current for said sink circuit.

11. In an addressing matrix the combination comprising:

a plurality of read/write cross points, each cross point being defined by a row conductor and a pair of column conductors;

a memory disk with an information track for each read/write cross point arranged to transfer information between the disk and the cross points;

and electrical sink circuit adapted for receiving a first predetermined amount of direct current;

a pair of column select switching devices for each pair of column conductors, each one of the switching devices of each pair connected in circuit between one column conductor of a conductor pair and said electrical sink circuit;

a first source of potential for supplying, when connected to a selected cross point, an amount of direct current less than said first predetermined amount of current for said sink circuit;

a cross point selection circuit for closing a pair of column select switching devices for applying said first source of potential to a row conductor of a cross point selected by the selection circuit;

a transmission line for transmitting information recovered from said disk by said selected cross point;

isolating means connected between said transmission line and a selected cross point for presenting a blocking impedance to direct current from said first potential source through a selected cross point to said sink circuit, said isolating means being capable of assuming a low impedance condition in response to current flow therethrough;

a second source of direct current for supplying the remainder of said first predetermined amount of current for said sink circuit; and means connected between said transmission line and said second source for supplying the remainder of said fixed amount of current to said sink circuit through a direct current path including said transmission line and said isolating means.

12. In an addressing matrix, the combination defined by claim 11 wherein:

said isolating means comprises a pair of unilateral current conducting devices one each connected between one of said column conductors and said transmission line and each poled in a back-biased condition following said row and column select operation by said cross point selection circuit for presenting a high impedance between said column conductors and said transmission line to signals recovered by a selected cross point.

13. In an addressing matrix, the combination as defined in claim 12 wherein:

said electrical current sink comprises a third source of potential chosen relative to said first potential source and said second source of constant current for receiving said first predetermined amount of direct current.

14. In an addressing matrix, the combination in accordance with claim 13 and further comprising:

a fourth source of potential, having a polarity and magnitude complementing said third source of potential for adapting said sink circuit to receive a second and higher predetermined amount of direct current;

a write current control switching device connected in common between all of said column select switching devices and said fourth source of potential;

and a read/write control unit for closing said write control during a write operation and for disconnecting said second source of direct current from said transmission line during a write operation.

15. In an addressing matrix, the combination defined by claim 14 and further comprising:

a bistable device having a control input lead connected to said read/write control unit, and having two output leads, one each connected to one each of the pair of column select switching devices associated with a selected cross point, said bistable device being operative for closing one only of said column select switching devices during a write operation for a binary one or zero, and for closing both of said column select switching devices during a read operation.

References Cited

UNITED STATES PATENTS

| | | | |
|---|---|---|---|
| 2,877,451 | 3/1959 | Williams | 340—174.1 |
| 2,932,008 | 4/1960 | Hoberg | 340—166 |
| 3,014,202 | 12/1961 | Hanewinkel | 340—176 |
| 3,020,117 | 2/1962 | Heijn et al. | 340—174.1 |
| 3,076,969 | 2/1963 | Fogarty | 340—174.1 |
| 3,092,817 | 6/1963 | Diamant | 340—174.1 |
| 3,187,316 | 6/1965 | Johnson et al. | 340—174.1 |
| 3,187,317 | 6/1965 | Smith | 340—174.1 |

ROBERT C. BAILEY, *Primary Examiner.*

J. P. VANDENBURG, *Assistant Examiner.*

UNITED STATES PATENT OFFICE
CERTIFICATE OF CORRECTION

Patent No. 3,336,581 August 15, 1967

Arnold J. Jorgensen et al.

It is hereby certified that error appears in the above numbered patent requiring correction and that the said Letters Patent should read as corrected below.

Column 6, line 48, for "isolated" read -- isolating --; column 7, line 20, for "tape" read -- tap --; column 8, line 30, for "introduces" read -- introduce --; column 12, line 33, after "write", second occurrence, insert -- current --.

Signed and sealed this 27th day of August 1968.

(SEAL)
Attest:

Edward M. Fletcher, Jr.
Attesting Officer

EDWARD J. BRENNER
Commissioner of Patents